(12) United States Patent
Thomas et al.

(10) Patent No.: US 11,904,811 B2
(45) Date of Patent: Feb. 20, 2024

(54) STORAGE ASSEMBLY FOR A VEHICLE

(71) Applicant: Ford Global Technologies, LLC, Dearborn, MI (US)

(72) Inventors: Gregory Paul Thomas, Canton, MI (US); Stephen Neal Jacobsen, Plymouth, MI (US); Michele Marie Matthews, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 320 days.

(21) Appl. No.: 17/188,181

(22) Filed: Mar. 1, 2021

(65) Prior Publication Data
US 2022/0274530 A1 Sep. 1, 2022

(51) Int. Cl.
*B60R 7/04* (2006.01)
*E05F 11/54* (2006.01)

(52) U.S. Cl.
CPC ............... *B60R 7/04* (2013.01); *E05F 11/54* (2013.01); *E05Y 2201/68* (2013.01); *E05Y 2900/538* (2013.01)

(58) Field of Classification Search
CPC ........ B60R 7/04; E05F 11/54; E05Y 2201/68; E05Y 2900/538
USPC ........................................................ 224/275
See application file for complete search history.

(56) References Cited

U.S. PATENT DOCUMENTS

| | | | |
|---|---|---|---|
| 6,059,243 A | 5/2000 | Hikage et al. | |
| 6,942,267 B1 * | 9/2005 | Sturt | B60N 3/102 248/311.2 |
| 7,004,527 B2 | 2/2006 | Niwa et al. | |
| 8,505,997 B2 * | 8/2013 | Hipshier | B60N 2/793 296/37.8 |
| 8,540,297 B2 | 9/2013 | Browne et al. | |
| 8,579,348 B1 | 11/2013 | Myers | |
| 8,714,617 B2 | 5/2014 | Hipshier et al. | |
| 9,481,323 B2 * | 11/2016 | Hipshier | B29C 45/1676 |
| 10,077,003 B2 | 9/2018 | Bozio et al. | |
| 10,189,414 B1 | 1/2019 | Huebner et al. | |
| 10,232,802 B2 | 3/2019 | Boinais | |
| 10,344,513 B2 | 7/2019 | Vanhoof et al. | |
| 10,766,390 B2 * | 9/2020 | Li | B60R 7/04 |
| 2007/0063553 A1 * | 3/2007 | Lilov | B60R 7/04 297/188.17 |
| 2007/0075559 A1 * | 4/2007 | Sturt | B60N 2/773 296/37.8 |
| 2015/0151656 A1 * | 6/2015 | Bozio | B60N 2/773 296/24.34 |

(Continued)

FOREIGN PATENT DOCUMENTS

JP H09169243 A 6/1997
WO 2012094340 A1 7/2012

*Primary Examiner* — Peter N Helvey
(74) *Attorney, Agent, or Firm* — Vichit Chea; Price Heneveld LLP

(57) ABSTRACT

A storage assembly for a vehicle includes a console housing including a storage compartment and an access opening to the storage compartment. The storage assembly includes a tambour door assembly having a tambour door panel configured to move between a first position to close the access opening and a second position to open the access opening. The storage assembly also has a tray assembly including the tambour door panel. The tray assembly is configured to move between a retracted position and an extended position relative to the console housing.

20 Claims, 12 Drawing Sheets

(56) References Cited

U.S. PATENT DOCUMENTS

| | | | |
|---|---|---|---|
| 2015/0258939 A1* | 9/2015 | Hipshier | B60R 7/04 160/229.1 |
| 2018/0118121 A1* | 5/2018 | Gorman, Jr. | B60R 7/04 |
| 2018/0370445 A1* | 12/2018 | Gillis | E05D 15/0621 |
| 2019/0039535 A1* | 2/2019 | Boinais | B60N 2/793 |
| 2019/0084486 A1* | 3/2019 | Harmelink | E05B 85/107 |
| 2020/0017032 A1* | 1/2020 | Catlin | E05F 1/16 |

* cited by examiner

STORAGE ASSEMBLY FOR A VEHICLE

FIELD OF THE DISCLOSURE

The present disclosure generally relates to a storage assembly for a vehicle. More specifically, the present disclosure relates to a storage assembly for a vehicle that includes a tambour door assembly and a tray assembly.

BACKGROUND OF THE DISCLOSURE

Vehicles often include storage compartments that provide a space for passengers to store items. These storage compartments can also provide passengers with other features, such as an armrest, cup holder, or a surface to set items on.

SUMMARY OF THE DISCLOSURE

According to at least one aspect of the present disclosure, a storage assembly for a vehicle includes a console housing having a storage compartment and an access opening to the storage compartment, a tambour door assembly including a tambour door panel configured to move between a first position to close the access opening and a second position to open the access opening, and a tray assembly including the tambour door panel. The tray assembly is configured to move between a retracted position and an extended position relative to the console housing.

According to another aspect of the present disclosure, a storage assembly for a vehicle includes a console housing having a storage compartment and an access opening to the storage compartment, a tambour door assembly including a tambour door panel, a track assembly disposed within the console housing, and a slide assembly. The tambour door panel is coupled with the track assembly for movement along the track assembly and is coupled with the slide assembly for movement between a retracted position and an extended position relative to the console housing.

According to another aspect of the present disclosure, a storage assembly for a vehicle includes a console housing having a storage compartment and an access opening to the storage compartment, a tambour door assembly including a tambour door panel, and a track assembly. The track assembly includes a first track portion configured to move relative to the console housing between a retracted position and an extended position and a second track portion configured to remain stationary relative to the console housing. The tambour door panel is configured to move along the first track portion in the retracted position and the second track portion between a first position to close the access opening and a second position to open the access opening.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
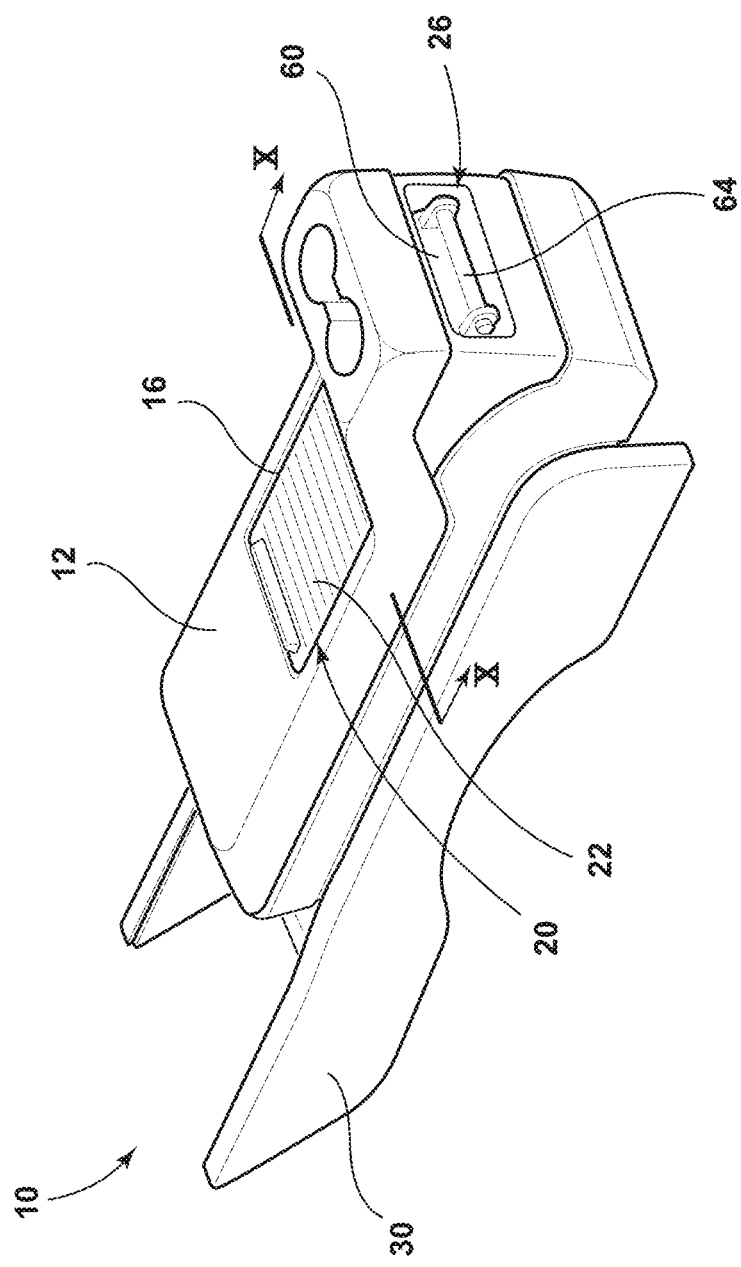
FIG. 1 is a perspective view of a storage assembly for a vehicle including a tambour door assembly in a closed position and a tray assembly in a retracted position, according to aspects of the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims.

Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-12, reference numeral 10 generally designates a storage assembly for a vehicle that includes a console housing 12 at least partially defining a storage compartment 14. The console housing 12 includes an access opening 16 that provides access to the storage compartment 14. The storage assembly 10 includes a tambour door assembly 20 that includes a tambour door panel 22 that is configured to move between a first position (FIGS. 1 and 5) to close the access opening 16 (also referred to herein as the "closed position") and a second position (FIG. 6) to open the access opening 16 to provide access to an interior of the storage compartment 14 (also referred to herein as the "open position"). The storage assembly 10 also includes a tray assembly 26 that includes the tambour door panel 22. The tray assembly 26 is configured to move between a retracted position (FIG. 1) and an extended position (FIG. 3) relative to the console housing 12.

Figure 2:
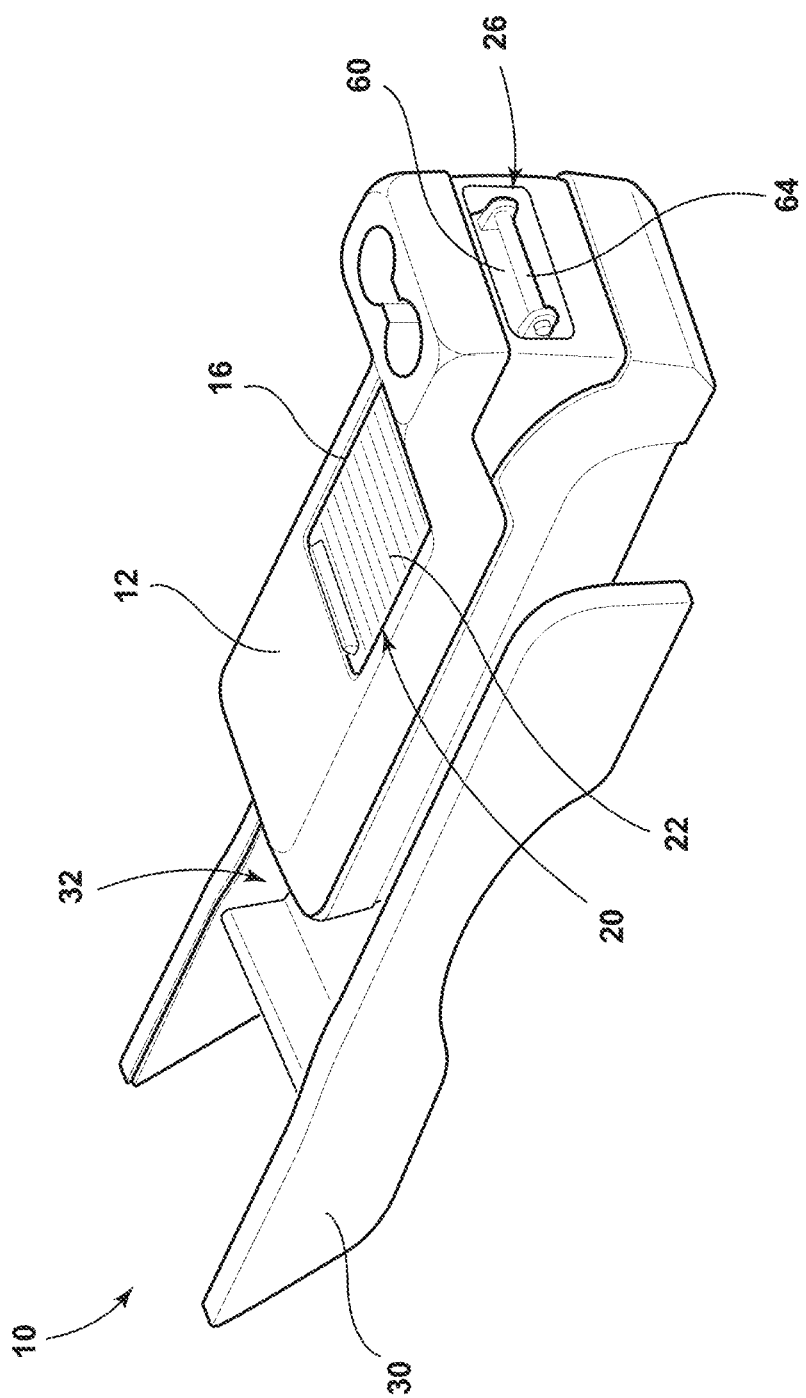
FIG. 2 is a perspective view of the storage assembly of FIG. 1 showing a first console housing portion in an extended position relative to a second console housing portion, according to aspects of the present disclosure.
Figure 3:
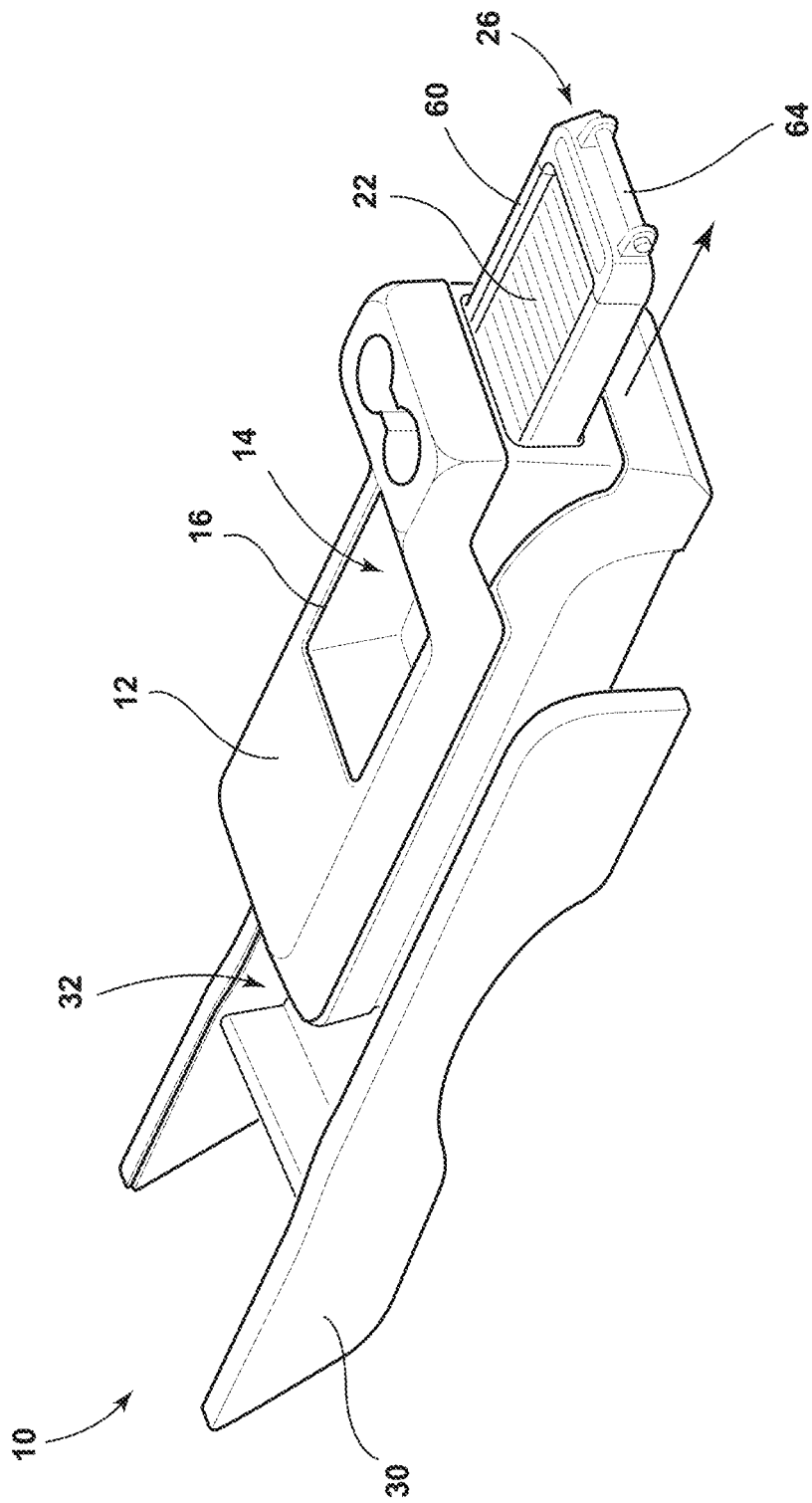
FIG. 3 is a perspective view of the storage assembly of FIG. 1 showing the tray assembly in an extended position, according to aspects of the present disclosure.

Referring to FIGS. 1-3, the storage assembly 10 is configured to be disposed within an interior of a vehicle and in a preferred aspect is disposed between adjacent first and second seats in a vehicle. For example, in some aspects the storage assembly 10 is disposed between a driver seat and a passenger seat in a vehicle. In other aspects, the storage assembly 10 is disposed between a pair of adjacent passenger seats. The storage assembly 10 can be configured such that the tray assembly 26 extends rearward of the adjacent vehicle seats when the tray assembly 26 is in the extended position. In other aspects, the storage assembly 10 can be configured such that the tray assembly 26 extends forward with respect to the adjacent vehicle seats when the tray assembly 26 is in the extended position. The storage assembly 10 may include additional optional components, such as cup holders, and may be made from any suitable type of materials or combination of materials based on the intended application of the storage assembly 10. Further, the shape and dimensions of the console housing 12 may be different than illustrated based on the intended application of the storage assembly 10.

In some aspects, the storage assembly 10 can be configured to include the console housing 12 as first console housing portion that is moveable relative to a second console housing portion 30, which may be fixed relative to the vehicle in which the storage assembly 10 is provided. The first console housing portion 12 can be coupled with the second console housing portion 30 using any suitable track or slide assembly to allow a user to selectively move the first console housing portion 12 relative to the second housing portion 30. As may best be seen in FIG. 3, movement of the first console housing portion 12 into an extended position relative to the second console housing portion 30 facilitates the distance to which the tray assembly 26 extends relative to the second console housing portion 30. Optionally, the second console housing portion 30 can include a storage compartment 32 that is accessible when the first console housing portion 12 is moved into the extended position relative to the second console housing portion 30.

Figure 4:
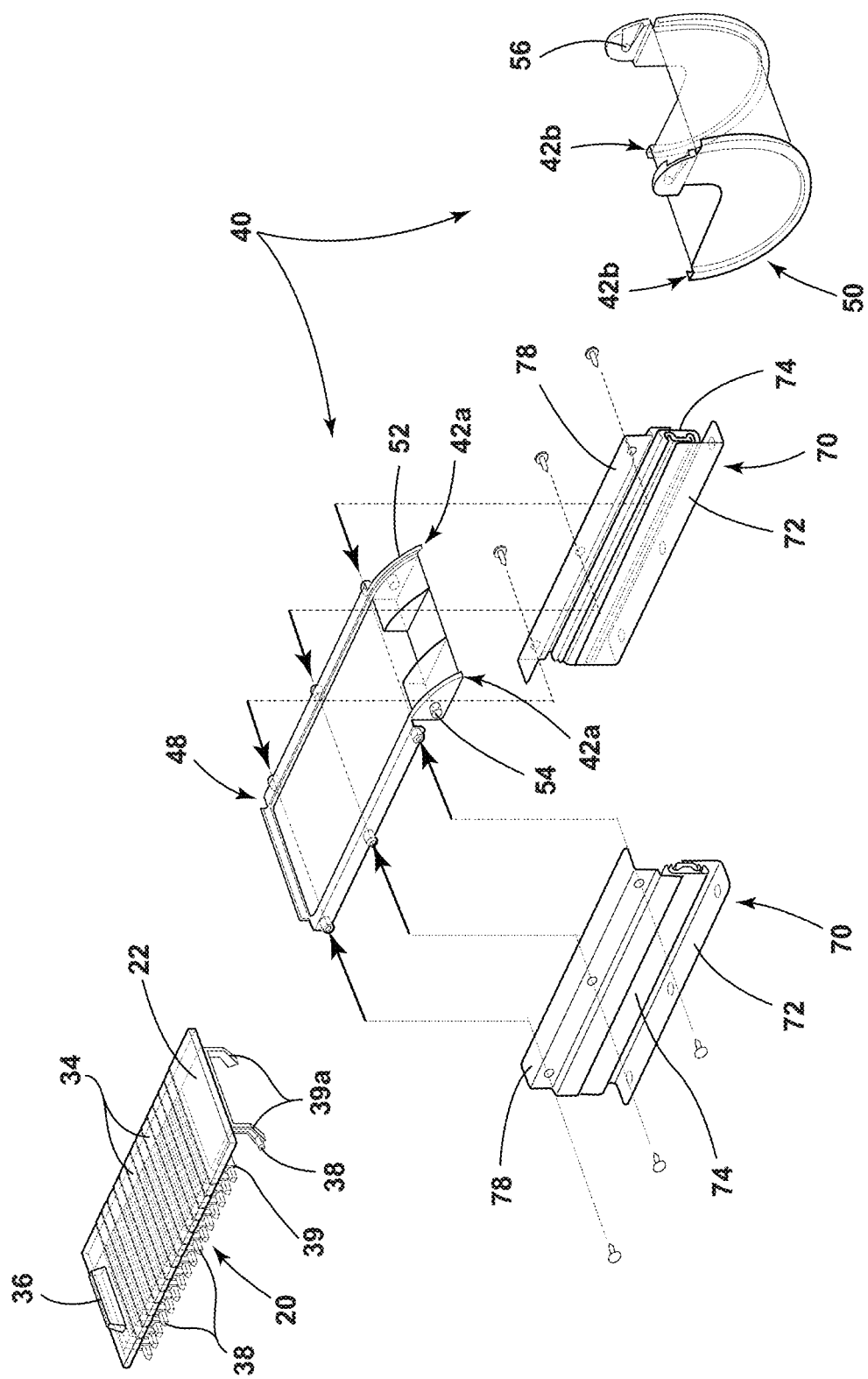
FIG. 4 is a partially exploded view of a tambour door assembly, a track assembly, and a slide assembly, according to aspects of the present disclosure.

Referring to FIG. 4, the tambour door panel 22 includes a plurality of interconnected slats or ribs 34. The ribs 34 may have any desired geometric cross-sectional shape, non-limiting examples of which include a circular, rectangular, or square cross-sectional shape. The ribs 34 may be interconnected by connecting elements, such as a webbing or mechanical connectors, for example, that are configured to allow the ribs 34 to articulate relative to one another as the tambour door panel 22 is moved between the open and closed positions. The ribs 34 and connecting elements can be made from any suitable material or combination of materials having sufficient rigidity to allow the tambour door panel 22 to provide a rigid cover/surface, yet flexible enough to allow the tambour door panel 22 to be moved between the open and closed positions. Optionally, the tambour door assembly 20 is provided with a grip or handle 36 to facilitate movement of the tambour door panel 22 between the open and closed positions. The tambour door panel 22 can also include a plurality of guides 38 provided on the opposing right and left sides of the tambour door panel 22. In some aspects, the guides 38 can be coupled with the ribs 34 through connecting elements 39. Non-limiting examples of materials suitable for use in forming the components of the tambour door assembly 20 include polymeric materials, metal and metal alloys, synthetic and natural woven materials, synthetic and natural leathers, acrylonitrile butadiene styrene (ABS), polycarbonate-acrylonitrile butadiene styrene (PC/ABS). One or more of the components of the tambour door assembly 20 can be mechanically coupled, integrally formed, and/or coupled using an adhesive or weld. The shape and dimensions of the ribs 34, guides 38, and connecting elements 39 may vary depending on the desired application and aesthetic.

Figure 5:
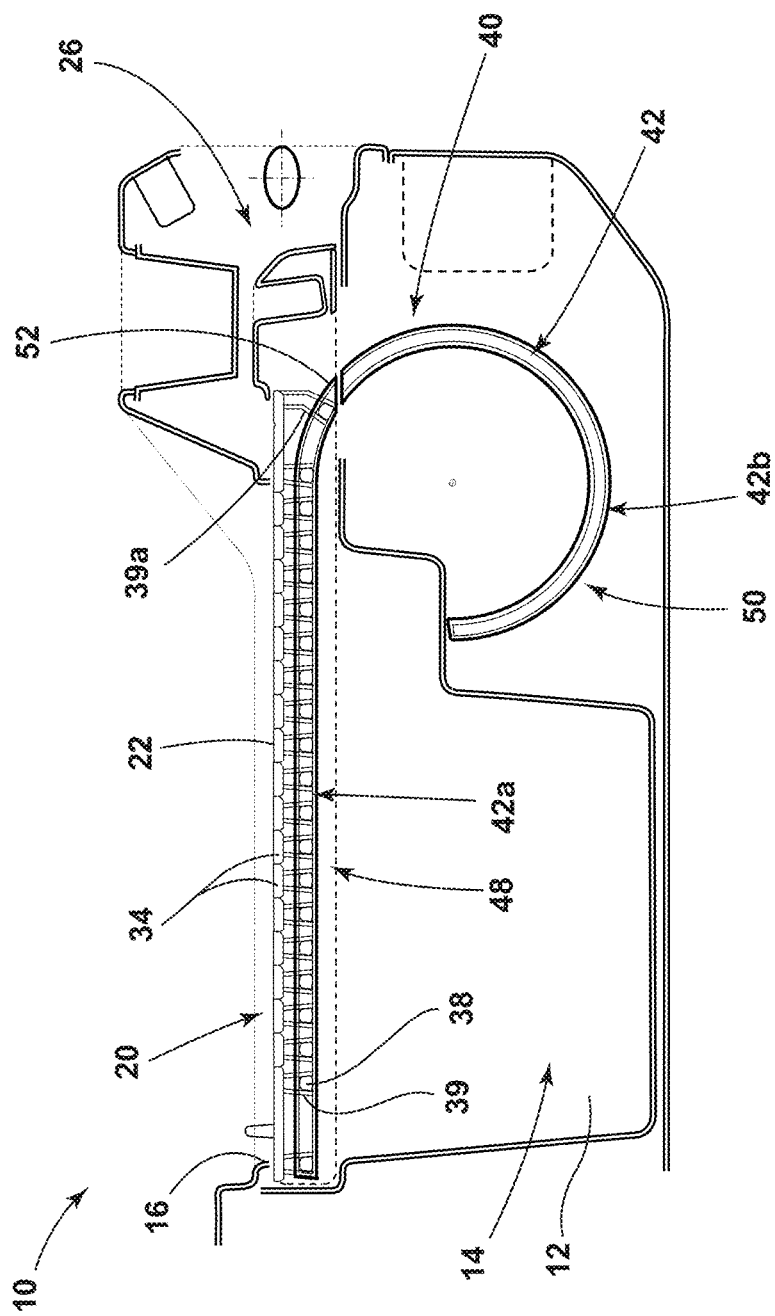
FIG. 5 is a cross-sectional view of a schematic of a storage assembly for a vehicle including a tambour door assembly in a closed position and a track assembly, according to aspects of the present disclosure.
Figure 6:
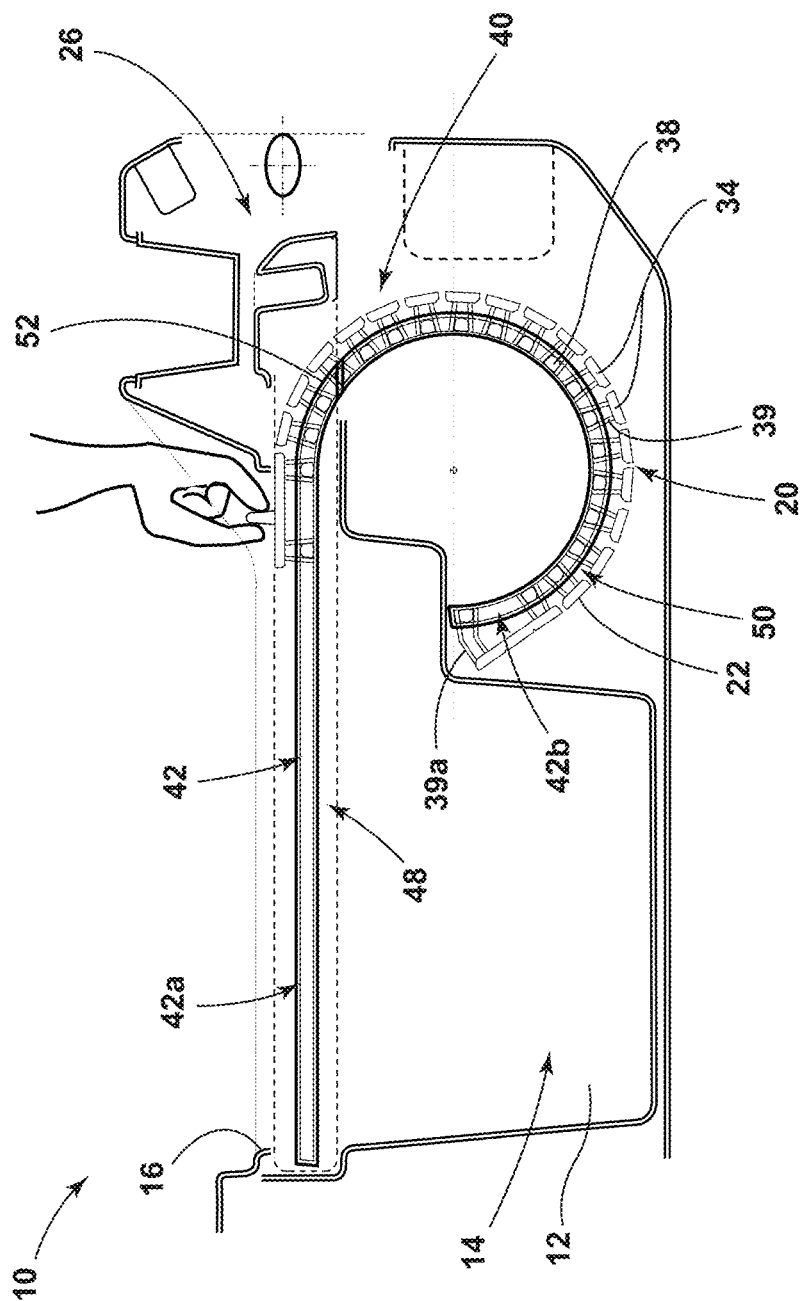
FIG. 6 is a cross-sectional view of a schematic of the storage assembly of FIG. 5 illustrating the tambour door assembly in an open position, according to aspects of the present disclosure.

Referring to FIGS. 4-6, the storage assembly 10 can be provided with a track assembly 40 that defines a path by which the tambour door panel 22 can travel between the open and closed positions. The track assembly 40 includes a pair of opposing left and right channels 42 which are configured to receive the guides 38 of the tambour door assembly 20 to facilitate movement of the tambour door panel 22 along the track assembly 40 between the closed position (FIG. 5) and the open position (FIG. 6). The track assembly 40 can include a first track portion 48 and a second track portion 50. The first track portion 48 includes first channel portions 42a and the second track portion 50 includes second channel portions 42b. When the first track portion 48 is in the retracted position within the console housing 12, the first and second channel portions 42a and 42b are aligned and together form the channels 42 that allow the tambour door panel 22 to move between the open and closed positions.

As illustrated in FIG. 5, the first track portion 48 is disposed adjacent to the access opening 16 such that when the tambour door panel 22 is in the fully closed position and extends along the length of the first track portion 48, the tambour door panel 22 closes the access opening 16. The first track portion 48 generally defines a planar track portion such that when the tambour door panel 22 is in the closed position, the tambour door panel 22 provides a generally planar support surface. As the tambour door panel 22 is moved from the closed position of FIG. 5 to the open position of FIG. 6, the guides 38 are moved along the first channel portions 42a and into the second channel portions 42b such that the tambour door panel 22 is moved along the first track portion 48 and onto the second track portion 50. In some aspects, the second track portion 50 can have a generally semi-circular cross-sectional shape, as illustrated in FIGS. 5 and 6, such that the tambour door panel 22 is wound around the second track portion 50 as the tambour door panel 22 is moved into the open position. Optionally, in some configurations, the second track portion 50 may extend downward from the end of the first track portion 48 such that the tambour door panel 22 is slid downward as the tambour door panel 22 is moved into the open position. The shape and configuration of the second track portion 50 can be based at least in part on the shape and dimensions of the console housing 12 in which the second track portion 50 is installed.

In some aspects, the first track portion 48 may include a curved portion at a proximal end 52 of the first track portion 48, adjacent to the second track portion 50. In this configuration, the tambour door assembly 20 can include one or more proximal connecting elements 39a that may have a length that is different than the other connecting elements 39 to facilitate maintaining the tambour door panel 22 in a generally planar position when in the closed position. The curvature of the second track portion 50 can be selected in concert with the length of the proximal connecting elements 39a to facilitate moving both the proximal connecting elements 39a and the remaining connecting elements 39 along the second track portion 50. In some aspects, the curvature of the second track portion 50 continues the curvature created by the proximal connecting elements 39a when the tambour door panel 22 is in the closed position of FIG. 5.

Figure 7:
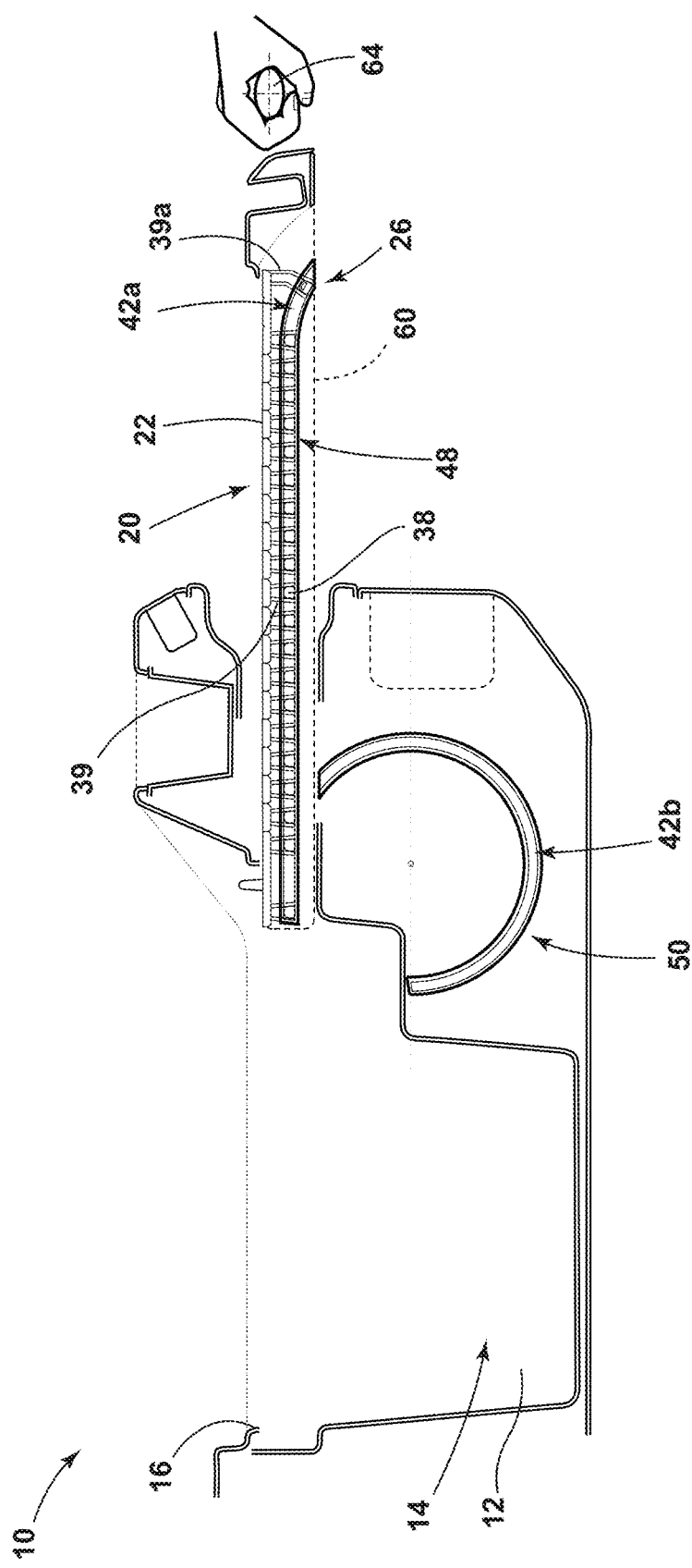
FIG. 7 is a cross-sectional view of a schematic of the storage assembly of FIG. 5 illustrating a tray assembly, a tambour door panel, and a portion of the track assembly in an extended position, according to aspects of the present disclosure.
Figure 8:
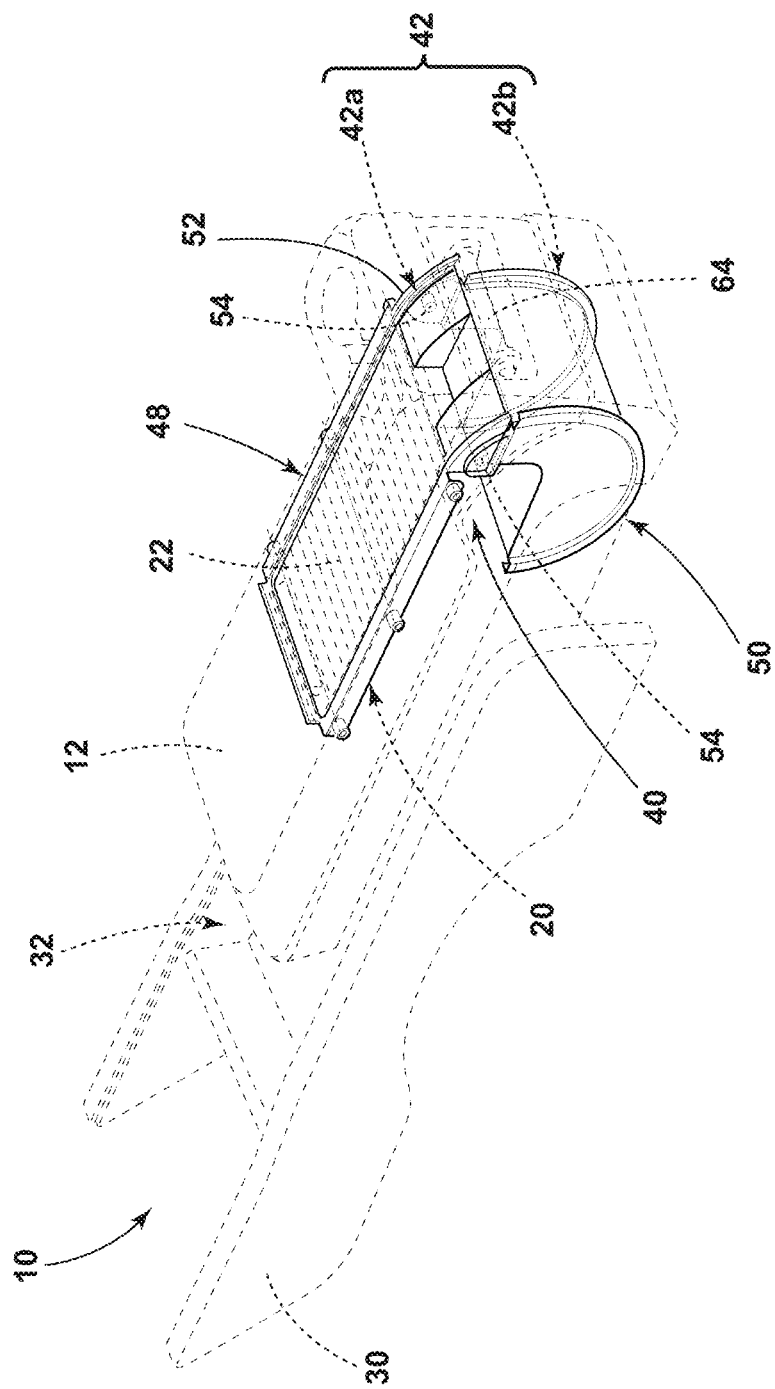
FIG. 8 is a perspective view of a storage assembly for a vehicle illustrating a tambour door assembly in a closed position within a console housing and a tray assembly in a retracted position within the console housing, according to aspects of the present disclosure.
Figure 9:
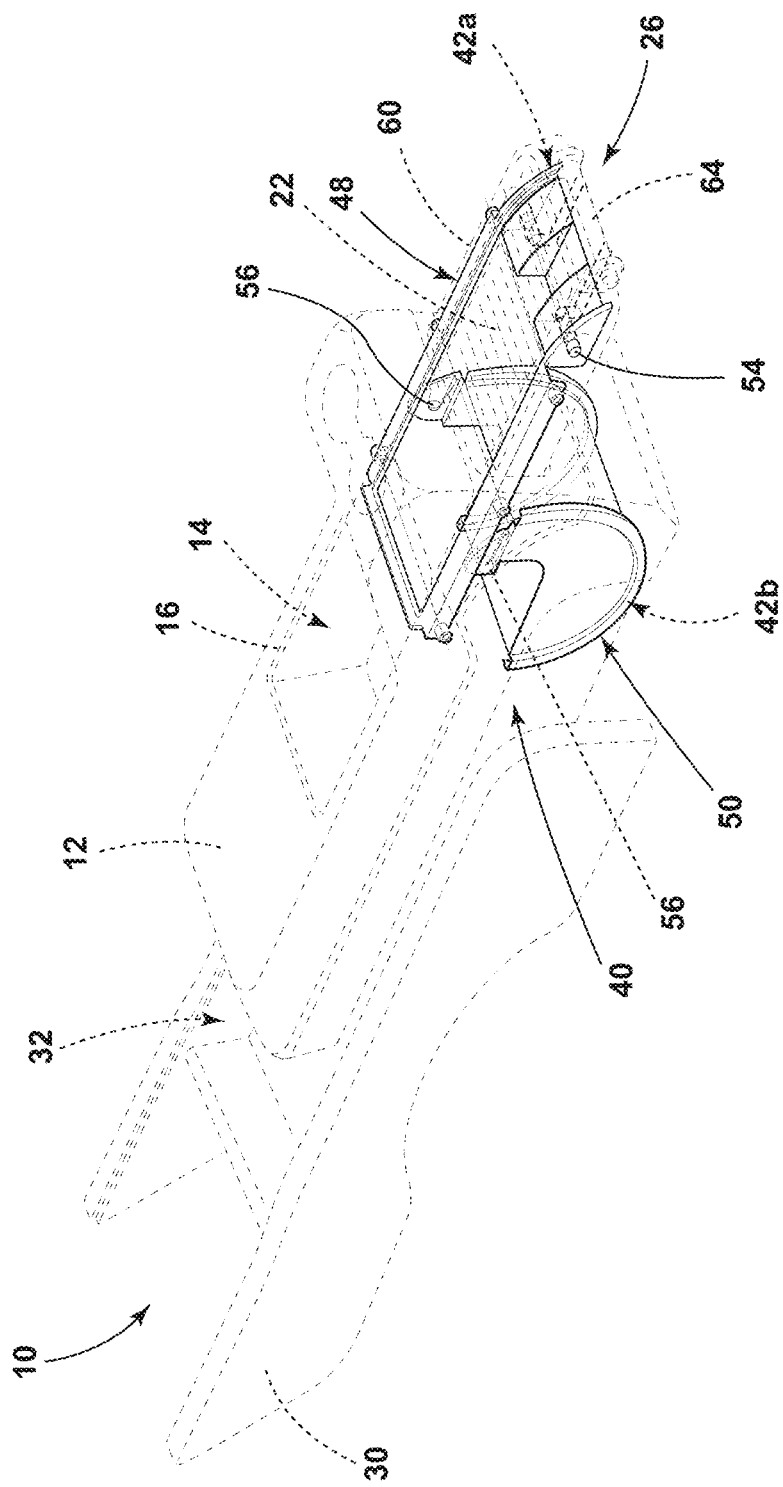
FIG. 9 is a perspective view of the storage assembly of FIG. 8 illustrating the tray assembly in an extended position relative to the console housing, according to aspects of the present disclosure.

Referring to FIGS. 5 and 7-9, the first track portion 48 is configured to be moveable with respect to the console housing 12 such that the first track portion 48 and the tambour door panel 22 can be moved between a retracted position (FIGS. 5 and 8) and an extended position (FIGS. 7 and 9) with respect to the console housing 12. Some components in FIGS. 8 and 9 are illustrated in dashed lines to illustrate some internal components relative to some external components. In this manner, the tambour door panel 22, when disposed within the first track portion 48, can form a part of the tray assembly 26 that is moveable between the retracted and extended positions. The second track portion 50 is configured to remain stationary within the console housing 12 such that the first track portion 48 is moveable with respect to the second track portion 50. FIG. 5 illustrates the tambour door assembly 20 in the closed position and the tray assembly 26 in the retracted position. As illustrated in FIG. 6, from the closed position of FIG. 5, the tambour door panel 22 can be moved along the first and second track portions 48 and 50 of the track assembly 40 to place the tambour door assembly 20 in the open position. Alternatively, from the closed position of FIG. 5, the tambour door panel 22 and the first track portion 48 can be moved together to form the tray assembly 26 in the extracted position.

Referring to FIGS. Band 9, in some aspects, the first track portion 48 can include a first engagement feature 54 that is configured to engage a second engagement feature 56 on the second track portion 50 when the first track portion 48 is in the retracted position within the console housing 12. The first and second engagement features 54, 56 can be configured such that when the first and second engagement features 54, 56 are engaged, the first and second channel portions 42a and 42b are aligned to form the left and right channels 42 which are configured to receive the guides 38 of the tambour door assembly 20 to facilitate movement of the tambour door panel 22 along the track assembly 40 between the closed position (FIG. 5) and the open position (FIG. 6).

The first and second engagement features 54, 56 can have any suitable configuration to facilitate alignment and/or coupling of the first and second track portions 48, 50 when the first track portion 48 is in the closed position. In one example, the first engagement feature 54 on the first track portion 48 is in the form of a latch pawl that can be received by the second engagement feature 56 on the second track portion 50. The second engagement feature 56 in this configuration can be any feature capable of mating with the latch pawl, such as a mating striker surface. In some aspects, the latch pawl can be provided on the second track portion 50 and the striker surface can be provided on the first track portion 48. The first and second engagement features 54, 56 can be provided on both the left and right sides of the track assembly 40 or on only a single side of the track assembly 40. In some aspects, the first and second engagement features 54, 56 can be configured to act as a stop to limit the movement of the first track portion 48 relative to the second track portion 50. In some aspects, the first and second engagement features 54, 56 can be configured such that an externally applied force is required to disengage and engage the first and second engagement features 54, 56. For example, the first engagement feature 54 can be configured to engage the second engagement feature 56 in a snap-fit or press-fit type of connection that requires a user to apply a pulling/pushing force to disengage/engage the first and second engagement features 54, 56. In another example, the first engagement feature 54 can be coupled with an actuator, such as a button or lever, which is configured to selectively engage/disengage the first engagement feature 54 from the second engagement feature 56. Non-limiting examples of types of first and second engagement features 54, 56 include snap-fit connectors, press-fit connectors, spring-biased connectors, etc.

Still referring to FIGS. 7-9, the tray assembly 26 can include a tray housing 60 that is operably coupled with the first track portion 48 and/or the tambour door panel 22 for corresponding movement of the tambour door panel 22 when the tray housing 60 is moved between the retracted and extended positions. For example, as illustrated in FIG. 9, the tray housing 60 can be coupled with the first track portion 48 through the first engagement features 54 such that movement of the tray assembly 26 results in a corresponding movement of the first track portion 48. In this manner, when the tambour door panel 22 is disposed within the first track portion 48, movement of the first track portion 48 through a corresponding movement of the tray housing 60 results in movement of the tambour door panel 22. The tray housing 60 can be configured to extend around at least a portion of the perimeter of the first track portion 48 such that the tray housing 60 at least partially encompasses the first track portion 48. Optionally, the tray housing 60 can include a handle 64 or other grip component to facilitate the ability of a user to move the tray assembly 26 between the retracted and extended positions. In some aspects, the handle 64 may include a button or actuator configured to selectively engage/disengage the first and second engagement features 54 and 56.

Figure 10:
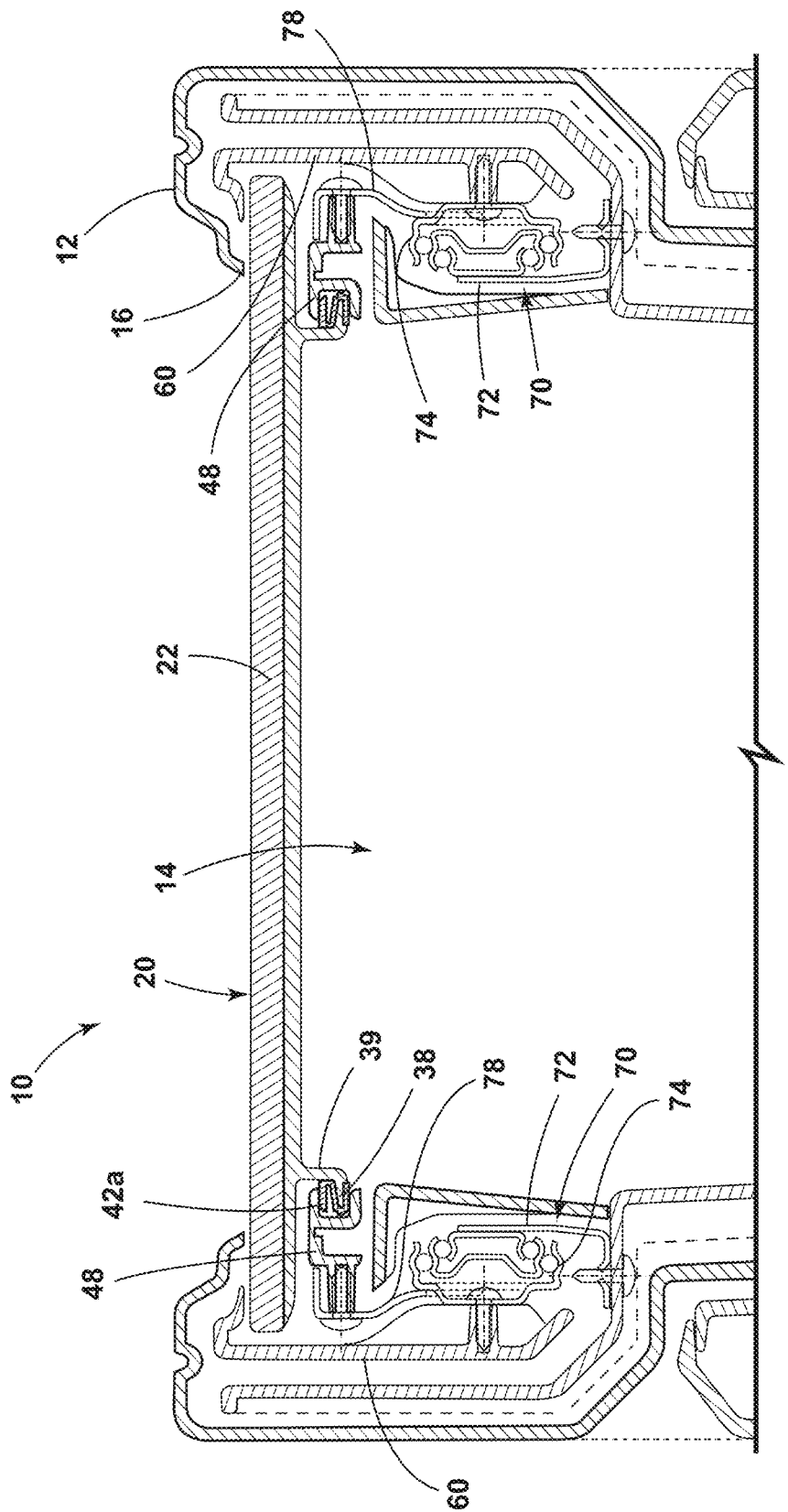
FIG. 10 is a cross-sectional view of a portion of a storage assembly for a vehicle taken along the line X-X of FIG. 1 illustrating a tambour door assembly in a closed position and a tray assembly in a retracted position, according to aspects of the present disclosure.
Figure 11:
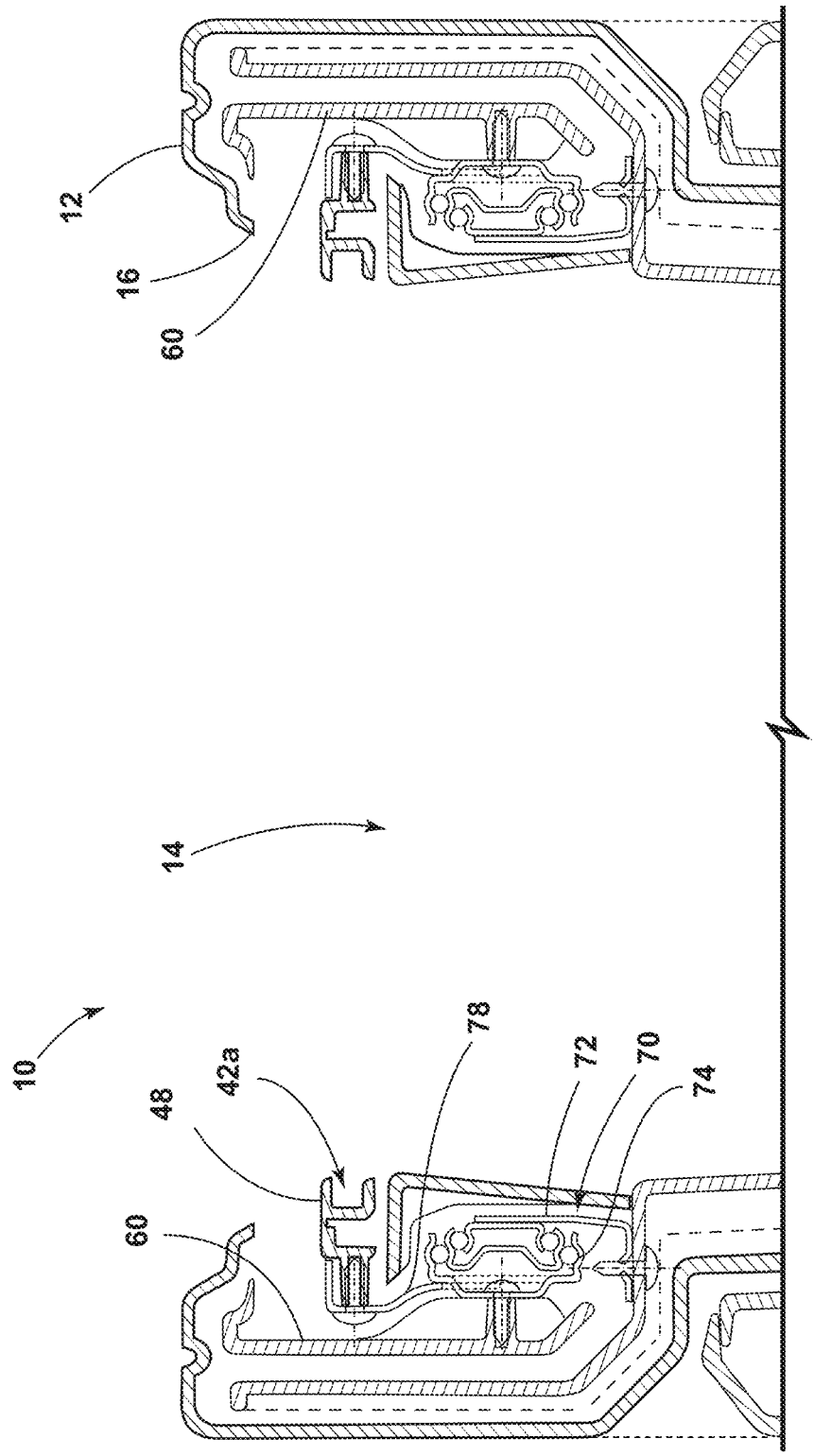
FIG. 11 is a cross-sectional view of a portion of the storage assembly of FIG. 10 illustrating the tambour door assembly in an open position and the tray assembly in the retracted position, according to aspects of the present disclosure.

Referring to FIGS. 4, 10, and 11, the storage assembly 10 can include a slide assembly 70 coupled with the tray assembly 26 and the first track portion 48 to facilitate movement of the tray assembly 26, including the first track portion 48 and the tambour door panel 22, between the retracted and extended positions. The slide assembly 70 can be any suitable system configured to allow for sliding movement of the tray assembly 26 and first track portion 48, non-limiting examples of which include ball bearing slides and drawer slides. While components of the slide assembly 70 are described in the context of components on a single side of the tray assembly 26, it is understood that the slide assembly 70 can include a corresponding set of components on each side of the tray assembly 26.

Still referring to FIGS. 4, 10, and 11, the slide assembly 70 can include a rail 72 coupled with the console housing 12 and a slide 74 coupled with the tray housing 60 that is configured to slide relative to the rail 72. The first track portion 48 can be coupled with the slide 74 and/or the tray housing 60 for movement with the slide 74 relative to the rail 72 by a bracket 78. While the slide 74 is illustrated as being slidably coupled with the rail 72 through a ball bearing slide system, it is within the scope of the present disclosure for the rail 72 and slide 74 to be slidably coupled using other types of slide systems. The linear rail 72 and slide 74 can be coupled with the console housing 12 and tray housing 60, respectively, using any suitable mechanical fasteners (e.g., screws), adhesives, welds, and/or molding.

The tambour door panel 22 of the present disclosure can be used as part of a tambour door assembly 20 to selectively open and close the access opening 16 to the storage compartment 14 and used to form a tray assembly 26 that can be extended relative to the console housing 12 to provide a support surface. In this manner, the tambour door panel 22 is a multi-functional component of the storage assembly 10. As illustrated in FIGS. 5 and 6, the tambour door panel 22 is coupled with the track assembly 40 for movement between the open and closed positions, and in this manner forms a part of the tambour door assembly 20. As illustrated in FIGS. 7-9, the tambour door panel 22 is movable with the tray housing 60 between the retracted and extended positions, and in this manner forms a part of the tray assembly 26. The track assembly 40 includes a first track portion 48 that supports the tambour door panel 22 in the closed position, which also corresponds to the retracted position of the tray assembly 26. The first track portion 48, with the tambour door panel 22 disposed therein, is moveable with the tray housing 60 into the extended position to provide the tray assembly 26 extending from the console housing 12.

Figure 12:
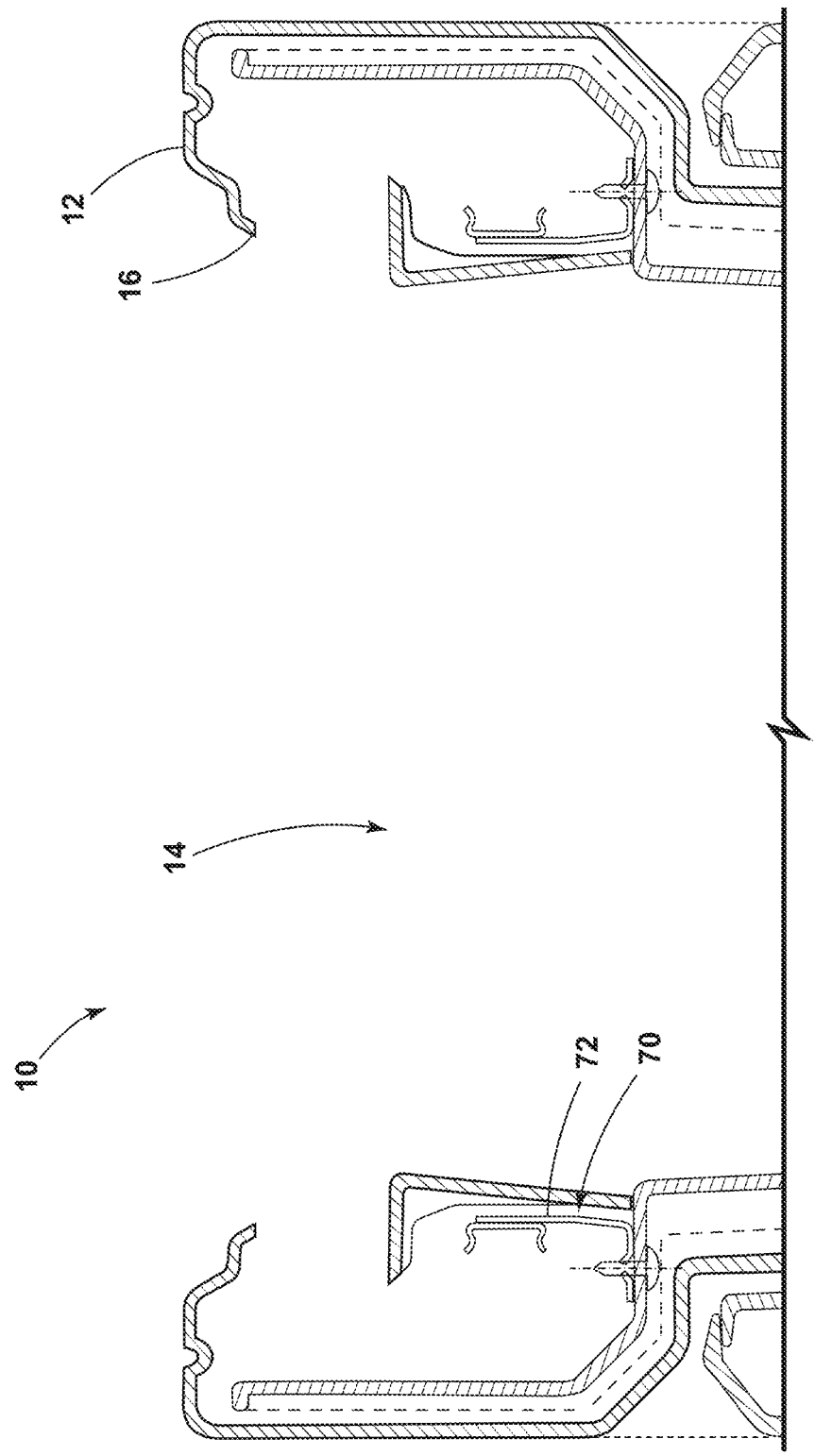
FIG. 12 is a cross-sectional view of a portion of the storage assembly of FIG. 10 illustrating the tray assembly in an extended position, according to aspects of the present disclosure.

As illustrated in FIG. 10, when the tambour door assembly 20 is in the closed position and the tray assembly 26 is in the retracted position, the tambour door panel 22 is coupled with the first track portion 48 and disposed within the console housing 12. When the tambour door assembly 20 is in the closed position and the tray assembly 26 is in the retracted position, the slide assembly 70 is also in the retracted position, as illustrated in FIG. 9. In the closed/retracted configuration of FIG. 9, the first track portion 48 is engaged with the second track portion 50, such as is illustrated in FIG. 8, such that the tambour door panel 22 can be moved along the first track portion 48 and into the second track portion 50 as the tambour door panel 22 is moved from the closed position to the open position. As illustrated in FIG. 11, when the tambour door panel 22 is in the open position, the first track portion 48, the tray housing 60, and the slide assembly 70 remain in the retracted position within the console housing 12. As illustrated in FIG. 12, when the tambour door panel 22 is coupled with the first track portion 48 and the first track portion 48 is moved into the extended position to form the tray assembly 26, the tambour door panel 22, the first track portion 48, the tray housing 60, and the slide 74 can all move into the extended position relative to the console housing 12. At least a portion of the slide assembly 70 remains within the console housing 12 when the tray assembly 26 is moved into the extended position. When the tray assembly 26 is in the extended position, the storage compartment 14 is also accessible, as illustrated in FIG. 3.

Aspects of the present disclosure provide a combined tambour door assembly and tray assembly that allows a user to choose between opening and closing a storage compartment using the tambour door assembly or extending and retracting a tray assembly. The tambour door panel of the present disclosure may be considered a multi-functional component, as the tambour door panel can be operated to open and close access to a storage compartment and be operated to selectively form a tray extending from the console housing. The tambour door assembly of the present disclosure is configured to allow a user to move a tambour door panel between open and closed positions while the tambour door panel remains confined within the console housing. In other words, the tambour door panel can be moved into the open position to provide access to the storage compartment without having to extend the tray assembly. This configuration allows a user to open the tambour door assembly and access the storage compartment without having to provide a clear space exterior of the console housing.

According to various examples, a storage assembly for a vehicle includes a console housing comprising a storage compartment and an access opening to the storage compartment, a tambour door assembly comprising a tambour door panel configured to move between a first position to close the access opening and a second position to open the access opening, and a tray assembly comprising the tambour door panel, wherein the tray assembly is configured to move between a retracted position and an extended position relative to the console housing. Embodiments of the present disclosure may include one or a combination of the following features:

a slide assembly coupled with the tray assembly and configured to move the tray assembly between the retracted position and the extended position;

a track assembly coupled with the tambour door panel, wherein the tambour door panel is moveable along the track assembly between the first position and the second position;

wherein the track assembly comprises a first track portion configured to hold the tambour door panel in the first position, and wherein the first track portion is coupled with the tray assembly and is configured to move with the tray assembly between the retracted position and the extended position;

the tray assembly comprises a handle configured to facilitate movement of the tray assembly between the retracted position and the extended position; and the console housing is disposed between a first vehicle seat and a second vehicle seat.

According to yet another example, a storage assembly for a vehicle includes a console housing comprising a storage compartment and an access opening to the storage compartment, a tambour door assembly comprising a tambour door panel, a track assembly disposed within the console housing, and a slide assembly. The tambour door panel can be coupled with the track assembly for movement along the track assembly and is coupled with the slide assembly for movement between a retracted position and an extended position relative to the console housing. Embodiments of the present disclosure may include one or a combination of the following features:

a plurality of guides coupled with the tambour door panel and a channel defined by the track assembly and configured to receive the plurality of guides, wherein the plurality of guides are moveable within the channel for movement of the tambour door panel along the track assembly;

a first track portion configured to move relative to the console housing and a second track portion configured to remain stationary relative to the console housing;

the tambour door panel is moveable along the track assembly between a first position to close the access opening and a second position to open the access opening;

a tray assembly comprising a tray housing coupled with the tambour door panel and the slide assembly, wherein the tray housing and tambour door panel are coupled with the slide assembly for movement between the retracted position and the extended position;

the console housing is disposed between a first vehicle seat and a second vehicle seat; and the console housing comprises a first housing portion and a second housing portion, and wherein the first housing portion is configured to move relative to the second housing portion.

According to yet another example, a storage assembly for a vehicle includes a console housing comprising a storage compartment and an access opening to the storage compartment, a tambour door assembly comprising a tambour door panel, and a track assembly. The track assembly includes a first track portion configured to move relative to the console housing between a retracted position and an extended position and a second track portion configured to remain stationary relative to the console housing. The tambour door panel can be configured to move along the first track portion in the retracted position and the second track portion between a first position to close the access opening and a second position to open the access opening. Embodiments of the present disclosure may include one or a combination of the following features:

a first engagement feature on the first track portion and a second engagement feature on the second track portion, wherein the first engagement feature is configured to engage the second engagement feature when the first track portion is in the retracted position;

a tray assembly coupled with the first track portion, wherein the tray assembly is configured to move the first track portion between the retracted position and the extended position;

the tray assembly comprises a tray housing that extends around at least a portion of a perimeter of the first track portion;

a plurality of guides coupled with the tambour door panel and a channel defined by the first track portion and the second track portion and configured to receive the plurality of guides, wherein the plurality of guides are moveable within the channel for movement of the tambour door panel along the track assembly;

the second track portion has a semi-circular cross-sectional shape; and the tambour door assembly and the track assembly are disposed within a first portion of the console housing that is moveable relative to a second portion of the console housing.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A storage assembly for a vehicle, comprising:
   a console housing comprising a storage compartment and an access opening to the storage compartment;
   a tambour door assembly comprising a tambour door panel configured to move between a first position on a first track portion to close the access opening and a second position on a second portion to open the access opening; and
   a tray assembly comprising the tambour door panel and the first track portion, wherein the tray assembly is configured to move between a retracted position and an extended position relative to the console housing, and wherein the first track portion is operatively coupled to the second track portion in the retracted position and is disconnected from the second track portion in the extended position.

2. The storage assembly of claim 1, further comprising:
   a slide assembly coupled with the tray assembly and configured to move the tray assembly between the retracted position and the extended position.

3. The storage assembly of claim 1, further comprising:
   a track assembly coupled with the tambour door panel, wherein the tambour door panel is moveable along the track assembly between the first position and the second position.

4. The storage assembly of claim 3, wherein the track assembly comprises a first track portion configured to hold the tambour door panel in the first position, and
   wherein the first track portion is coupled with the tray assembly and is configured to move with the tray assembly between the retracted position and the extended position.

5. The storage assembly of claim 1, wherein the tray assembly comprises a handle configured to facilitate movement of the tray assembly between the retracted position and the extended position.

6. The storage assembly of claim 1, wherein the console housing is disposed between a first vehicle seat and a second vehicle seat.

7. A storage assembly for a vehicle, comprising:
   a console housing comprising a storage compartment and an access opening to the storage compartment;
   a tambour door assembly comprising a tambour door panel;
   a track assembly disposed within the console housing and comprising a first track position and a second track portion; and
   a slide assembly, and
   wherein the tambour door panel is coupled with the track assembly for movement along the track assembly and is coupled with the slide assembly for movement between a retracted position and an extended position relative to the console housing, and wherein the first track portion is operatively coupled to the second track portion in the retracted position and is disconnected from the second track portion in the extended position.

8. The storage assembly of claim 7, further comprising:
   a plurality of guides coupled with the tambour door panel; and
   a channel defined by the track assembly and configured to receive the plurality of guides, and
   wherein the plurality of guides are moveable within the channel for movement of the tambour door panel along the track assembly.

9. The storage assembly of claim 7, wherein
   the first track portion is configured to move relative to the console housing and
   the second track portion is configured to remain stationary relative to the console housing.

10. The storage assembly of claim 7, wherein the tambour door panel is moveable along the track assembly between a first position on the first track portion to close the access opening and a second position on the second track portion to open the access opening.

11. The storage assembly of claim 7, further comprising:
    a tray assembly comprising a tray housing coupled with the tambour door panel and the slide assembly, and
    wherein the tray housing and tambour door panel are coupled with the slide assembly for movement between the retracted position and the extended position.

12. The storage assembly of claim 7, wherein the console housing is disposed between a first vehicle seat and a second vehicle seat.

13. The storage assembly of claim 7, wherein the console housing comprises a first housing portion and a second housing portion, and wherein the first housing portion is configured to move relative to the second housing portion.

14. A storage assembly for a vehicle, comprising:
    a console housing comprising a storage compartment and an access opening to the storage compartment;
    a tambour door assembly comprising a tambour door panel; and
    a track assembly comprising:
       a first track portion configured to move relative to the console housing between a retracted position and an extended position; and
       a second track portion configured to remain stationary relative to the console housing, and wherein the tambour door panel is configured to move along the first track portion in the retracted position and the second track portion between a first position to close the access opening and a second position to open the access opening, and wherein the first track portion is operatively coupled to the second track portion in the retracted position and is disconnected from the second track portion in the extended position.

15. The storage assembly of claim 14, further comprising:
a first engagement feature on the first track portion; and
a second engagement feature on the second track portion, and
wherein the first engagement feature is configured to engage the second engagement feature when the first track portion is in the retracted position.

16. The storage assembly of claim 14, further comprising:
a tray assembly coupled with the first track portion, wherein the tray assembly is configured to move the first track portion between the retracted position and the extended position.

17. The storage assembly of claim 16, wherein the tray assembly comprises a tray housing that extends around at least a portion of a perimeter of the first track portion.

18. The storage assembly of claim 14, further comprising:
a plurality of guides coupled with the tambour door panel; and
a channel defined by the first track portion and the second track portion and configured to receive the plurality of guides, and
wherein the plurality of guides are moveable within the channel for movement of the tambour door panel along the track assembly.

19. The storage assembly of claim 14, wherein the second track portion has a semi-circular cross-sectional shape.

20. The storage assembly of claim 14, wherein the tambour door assembly and the track assembly are disposed within a first portion of the console housing that is moveable relative to a second portion of the console housing.

* * * * *

UNITED STATES PATENT AND TRADEMARK OFFICE
CERTIFICATE OF CORRECTION

PATENT NO. : 11,904,811 B2
APPLICATION NO. : 17/188181
DATED : February 20, 2024
INVENTOR(S) : Thomas et al.

Page 1 of 1

It is certified that error appears in the above-identified patent and that said Letters Patent is hereby corrected as shown below:

In the Claims

Column 11:
Claim 1, Line 42 (2nd occurrence);
After "second" insert --track--.

Column 12:
Claim 7, Line 14 (1st occurrence);
After "track" insert --portion--.

Signed and Sealed this
Ninth Day of April, 2024

Katherine Kelly Vidal
*Director of the United States Patent and Trademark Office*